Oct. 1, 1963 W. PROC 3,105,933
TRANSISTOR REGULATED DIRECT CURRENT POWER SUPPLY
Filed July 31, 1959
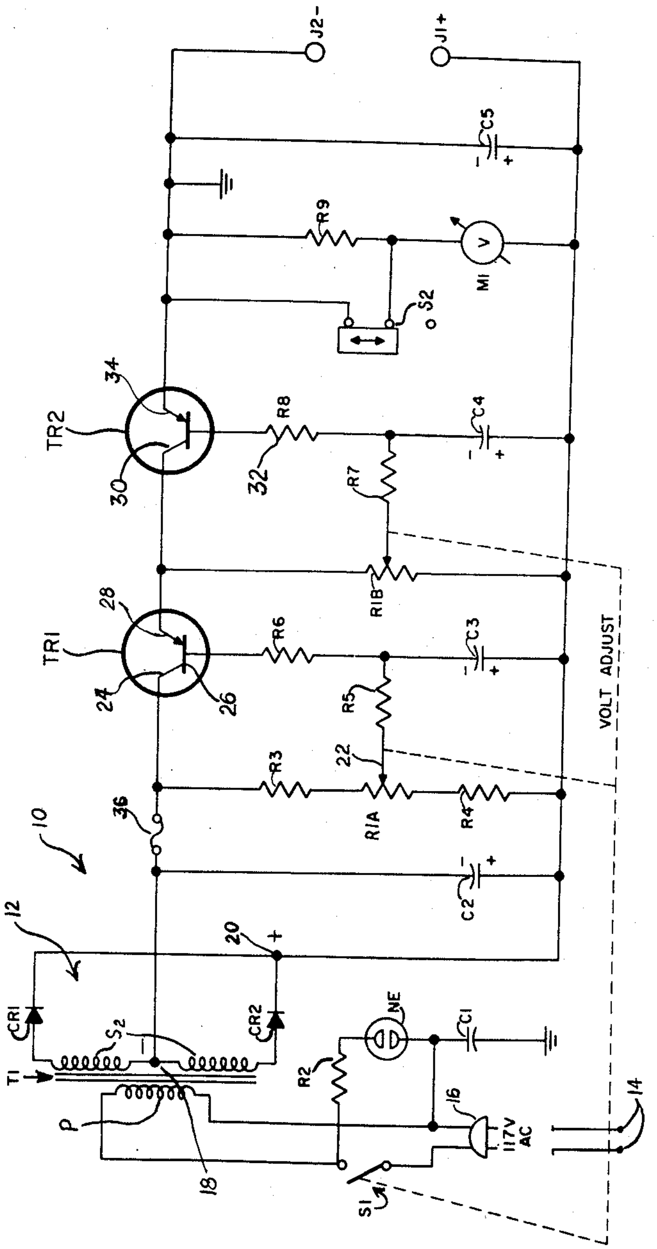
INVENTOR.
Wiatsheslaw Proc
BY Silverman, Mullin & Cass United States Patent Office 3,105,933

Patented Oct. 1, 1963

3,105,933

TRANSISTOR REGULATED DIRECT CURRENT POWER SUPPLY

Wiatsheslaw Proc, Long Island City, N.Y., assignor to Eico Electronic Instrument Co., Inc., a corporation of New York Filed July 31, 1959, Ser. No. 830,792
1 Claim. (Cl. 323—22)

This invention relates generally to low voltage D.C. power supply devices and more particularly is concerned with a power supply for laboratory use in which the apparatus utilizes semi-conductors for rectification and control of the output to provide a compact, economical device.

The uses to which the apparatus of the invention can be put are well known, but might advantageously be set forth herein. These include providing a reliable and known power supply in substitution of supplies of radios, television receivers and the like during servicing. It can be used to offset certain internal voltages such as automatic volume control, automatic gain control, and the like during the adjustment of electronic apparatus. As a matter of fact, any direct current device can be supplied with power from this apparatus providing the rated current is not exceeded. The apparatus is ideal for aid in the design of transistorized circuits.

The primary object of the invention is to provide a novel, and improved circuit for a transistorized D.C. power supply in which the control of the output is achieved through the use of an arrangement of components in which variations of the source providing the power input, including ripple and hum, will not substantially affect the output signal, without limiting the range and control of the apparatus.

An important object is to provide a transistorized D.C. power supply using a pair of transistors connected in a cascode arrangement as control elements to filter ripple to a high degree.

Still a further object of the invention is to provide a D.C. power and bias supply in which the principal filtering of the variations of pulsating rectified D.C. voltage is accomplished by means of semi-conductors operated at saturation to provide substantially constant output.

Many other objects and advantages will occur to those skilled in this art as the description of the invention proceeds, it being obvious that variations are also capable of being made in the details without sacrificing these objects and advantages.

The single FIGURE is a circuit diagram of a power and bias supply device constructed in accordance with the invention.

The conventional D.C. power supply, whether used in a structure which includes other components, such as instrumentation, radio frequency circuits, audio frequency circuits, and the like, has in the past been characterized by the use of capacitors and chokes in the output to filter ripple, primarily. The filter sections have been T's, Pi's, or combinations, and the amount of filtering achieved depended upon the amount of apparatus used. The more sections, the better filtering. In effect, therefore, for maximum filtering, one had to use more and more expensive components.

Passive components such as chokes, capacitors and resistors (since in economical power supplies, even resistors are used), have little value to provide good filtering, irrespective of the characteristics of filtering. Electromagnetic devices such as chokes are disadvantageous for other reasons, including weight and size, and the fact that there is a likelihood of saturation for high currents which means that ripple will increase with increase of current. This limits the capacity of a choke-filtered supply.

The invention herein is characterized by the use of transistors connected in series arrangement with so-called grounded collector configurations, so biased that they operate on substantially flat portions of the collector voltage-emitter current characteristic, whereby to filter ripple at the input and provide good regulation.

The circuit in the figure is arranged with the power source on the left and the load at the right. The conventional representation is usually the reverse. In this case, however, it may be considered that the transistors are acting as D.C. amplifiers of substantially unity gain, to give power amplification.

The circuit shown is designated generally by the reference character 10 and the power source is a full-wave rectifier designated generally by the reference character 12 which is energized from a conventional A.C. line 14. The apparatus which embodies the invention is self-contained and has an extension cord with the usual plug 16 which applies the line voltage across the primary winding P through a switch S–1. A resistor R–2 in series with a small neon bulb NE indicates when the switch S–1 is closed. Condenser C–1 provides a high frequency path to ground.

The transformer T–1 has a secondary winding S–2, the terminals of which connect in series with small rectifiers CR–1 and CR–2, conveniently of the semi-conductor type such as silicon diodes. The center tap 18 provides the negative terminal of the rectifier 12, and the positive terminal is at the junction 20 of the two diodes.

The full wave rectified voltage appears between the terminals 18 and 20, and a substantial portion of the ripple is filtered by the electrolytic condenser C–2 and applied across the voltage divider R–3, R–1A, R–4. The resistor R–1A is varied by the wiper 22 to control the amount of voltage across the upper portion of the voltage divider. This portion of the voltage, acting in series with the resistors R–5 and R–6 provide the collector-base bias for the transistor TR–1. The two transistors TR–1 and TR–2 are connected in grounded collector configuration, but are connected in series to afford larger power handling ability. Thus the collector 24 is connected to the negative terminal 18, the base 26 is connected to the upper end of the resistor R–6, being positive relative to the collector 24, and the emitter 28 is connected to the collector 30 of TR–2. Note that the base-emitter bias is provided by the voltage from the lower part of the voltage divider R–3, R–1A and R–4 operating through the resistors R–5 and R–6 as well as the variable resistor R–1B. The resistors R–7 and R–8 are also biasing resistors for the transistor TR–2 being in the circuit of the collector 30 and base 32.

The total output voltage of the circuit appears at the terminals J–1 and J–2, which are marked positive and negative respectively. Terminal J–2 is grounded and connected to the emitter 34. The voltmeter M–1 is in series with a multiplier resistor R–9 that can be short circuited by a slide switch S–2.

The capacitors C–3, C–4 and C–5 are all high capacitance electrolytics for additional filtering purposes.

The transistors TR–1 and TR–2 are connected as D.C. amplifiers or static devices, and hence while reference is made to biases above, the circuit components actually determine the voltage and current outputs of the transistors. The two transistors function in effect as filters since the circuit values of the transistors are chosen to provide operation on very flat portions of the characteristic which controls the output voltage. This means that small variations in the collector voltage caused by ripple and change in the line voltage will not appear in the emitter current.

For the purposes of this discussion, this may be considered a form of saturation. The transistors function in this instance as constant current devices.

Obviously where a single transistor has the current capacity needed for the instrument, only one need be used.

In the practical structure the resistors R–1A and R–1B are ganged with the switch S–1. The variation of these resistors varies the collector-base voltage of the transistors and hence will change the voltage across the terminals J–1 and J–2.

The fuse 36 is in the secondary circuit of the transformer T–1 and is thus located to prevent overload of the transistors.

The circuit is simple and has a wide range of values and thus is flexible and quite desirable in service and laboratory work. A practical structure which provided an output at J–1 and J–2 of up to 30 volts D.C. with current capacity up to about 300 milliamperes used a pair of 2N256 power transistors. The transformer T–1 had a secondary voltage of about 36 volts RMS which gave a rectified D.C. voltage across the collector 24 and the bottom end of R–4 of the order of 40 volts D.C.

The components of this circuit had the following values:

| | |
|---|---|
| R–1A, R–1B | 2000 ohms each. |
| R–2 | 22,000 ohms. |
| R–3, R–6, R–8 | 100 ohms each. |
| R–4 | 2200 ohms. |
| R–5, R–7 | 220 ohms each. |
| R–9 | 1500 ohms. |
| C–1 | .01 microfarad. |
| C–2 | 500 microfarads. |
| C–3, C–4 | 300 microfarads each. |
| C–5 | 50 microfarads. |

The voltmeter has two ranges, 6 volts and 30 volts.

The output of the above described practical structure had very low ripple, namely, 1/200 of 1%, over the entire range of available voltage.

It is believed that the invention has been sufficiently described to enable those skilled in this art to understand the manner of using the same and making structures in accordance with the teachings thereof. Variations in details are contemplated within the scope of the coverage as defined by the appended claim.

What it is desired to secure by Letters Patent is:

Apparatus for variably translating a direct current signal having an alternating component imposed thereon from a source having positive and negative input terminals to first and second output terminals adapted for connection of a load impedance thereacross, said translating apparatus comprising, a first resistor connected across said input terminals, a tap connected variably to said first resistor, a first filter capacitor connected across said input terminals, a three electrode transistor having base, emitter and collector electrodes, said collector electrode being connected to said negative input terminal and said emitter electrode having a biasing resistor connected to said positive terminal, said transistor being of a conductivity type for conduction in a forward direction from said positive input terminal to said negative input terminal, a base resistor and a second filter capacitor connected in series from said base electrode to said positive input terminal, a next resistor connected between said variably connected tap and a common point between said base resistor and said last named filter capacitor, circuit means for connecting said emitter electrode to said first output terminal, and means connecting said second output terminal with said positive terminal.

References Cited in the file of this patent

UNITED STATES PATENTS

| | | |
|---|---|---|
| 2,398,916 | Brewer | Apr. 23, 1946 |
| 2,629,014 | Edwards | Feb. 17, 1953 |
| 2,751,549 | Chase | June 19, 1956 |
| 2,755,428 | Baum | July 17, 1956 |
| 2,897,430 | Winkel | July 28, 1959 |
| 2,906,941 | Brolin | Sept. 29, 1959 |
| 2,920,265 | Siedband | Jan. 5, 1960 |
| 2,995,697 | Grenier | Aug. 8, 1961 |

FOREIGN PATENTS

| | | |
|---|---|---|
| 124,477 | Russia | Mar. 3, 1959 |

OTHER REFERENCES

"The Cathode Follower as a Voltage Regulator," by A. P. Willmore; published in Electronic Engineering (September 1950), pages 399 and 400 relied on. Copy in Scientific Library and Division 71.